March 8, 1955 W. M. SUPINGER 2,703,650
FILTER CARTRIDGE
Filed Nov. 26, 1951

INVENTOR.
WILLIAM M. SUPINGER
BY
Wm. H. Dean
AGENT

United States Patent Office 2,703,650
Patented Mar. 8, 1955

2,703,650

FILTER CARTRIDGE

William M. Supinger, San Diego, Calif.

Application November 26, 1951, Serial No. 258,150

5 Claims. (Cl. 210—148)

My invention relates to a filter cartridge more particularly to a replaceable cartridge for use in connection with fluid filters for various uses and the objects of my invention are:

First, to provide a filter cartridge of this class wherein a central coil spring abuts rings at its opposite ends which impart tension to the covers of the cartridge and maintains the element longitudinally of the axis of the spring.

Second, to provide a filter cartridge of this class having considerable longitudinal resilience adapted to intimately contact the sealing mechanism at each opposite end of the filter casing in which said cartridge may be positioned.

Third, to provide a filter cartridge of this class having a centrally disposed coiled spring abutting substantially rigid rings at opposite ends thereof which transfer tension to the foraminous covers of the filter cartridge whereby the covers may enclose an element of any desired material for any particular filtering operation.

Fourth, to provide a filter cartridge of this class having a central coil spring abutted at its opposite ends to diametrically rigid rings having central openings therein substantially smaller than the external diameter of the spring whereby positive forceful pressure of the spring is transmitted by said rings to the fabric covers surrounding the filtering element externally of and surrounding said springs.

Fifth, to provide a filter cartridge of this class which does not rely upon the filter element material therein for longitudinal compression in the filter element casing in order to provide a seal at opposite ends thereof.

Sixth, to provide a filter cartridge of this class having a central spring abutted at its opposite ends to diametric rigid rings which transfer tension from said springs to spaced foraminous covers concentric to each other which may be employed individually without any material therebetween if desired.

Seventh, to provide a filter cartridge of this class having a central coil spring abutted at its opposite ends to diametrically rigid rings which transfer tension to element covers, the ends of which are clamped between said spring and said rings and Eighth, to provide a filter cartridge of this class having a central coil spring which imparts tension to element covers through the medium of diametrically rigid rings abutted to opposite ends of the spring whereby various close woven fabrics may be used in the element covers or other material may be used to accommodate the performance of certain filtering operations as desired and;

Ninth, to provide a filter cartridge of this class which is very simple and economical of construction, efficient in operation and which will not readily deteriorate or get out of order.

With these and other objects in view as will appear hereinafter my invention consists of certain novel features of construction, combination and arrangement of parts and portions and a certain modification as will be hereinafter described in detail and particularly set forth in the appended claims, reference being had to the accompanying drawings and to the characters of reference thereon forming a part of this application in which:

The spring, rings 2 and 3, foraminous covers 4 and 5, elements 6 and 7, constitute the principal parts and portions of my filter cartridge.

Figure 1:
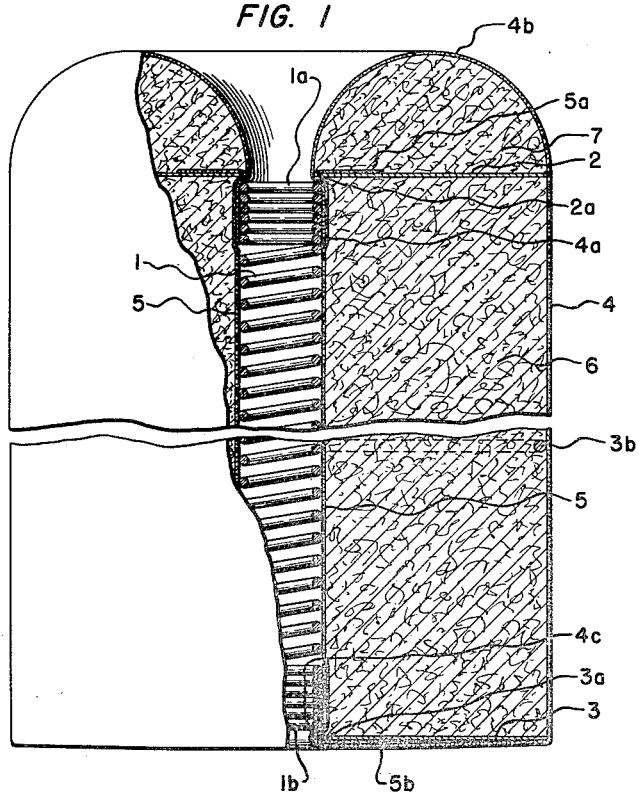
Figure 1 is a side elevational view of my filter cartridge showing portions broken away and in section to Figure 2 is a similar view of a modified form of my filter cartridge.

The spring 1 is a coil spring of spring steel having a considerable amount of compressive resilience. The rings 2 and 3 are flat rings preferably made of sheet metal or the like which are provided with central openings 2a and 3a substantially equal in diameter to the internal diameter of the coil spring 1, plus the combined fabric thickness of the covers 4 and 5 at opposite sides of said openings 2a and 3a. The foraminous inner cover 5 is a tubular foraminous structure preferably made of fabric or other suitable material which surrounds the spring 1 in intimate relationship therewith. The one end 5a of this inner cover 5 is folded intermediate the end 1a of the spring 1 and the ring 2 and is folded over the upper side of said ring 2 all as shown best in Fig. 1 of the drawings. The cover 4 is a tubular fabric structure concentric with the cover 5 and of considerably larger diameter. This cover 4 is folded through the opening 2a in the ring 2 and extended between the end 1a of the spring 1 and the plate 2 and is positioned at its downwardly extending end 4a in surrounding relationship with the spring 1 internally of the cover 5 all as shown best in Fig. 1 of the drawings. The cover 4 above the ring 2 is arranged in the form of annular semi-circular in cross section structure 4b in which the element 7 is positioned, thus the one end of the filter cartridge as shown in Fig. 1 of the drawings, is curved at its periphery inwardly toward its end. The opposite end of the cover 4 extends in surrounding relationship to the end 1b of the spring 1 and extends intermediate the ring 3 and said end 1b of the spring 1 for interlocking said cover member 4 at its portion 4c. The normally lower end 5b of the inner cover 5 extends radially from the opening 3a in the plate 3 and is covered by the cover 4 as shown best in Fig. 1 of the drawings in which both the inner cover 5 and the outer cover 4 are interlocked with the diametrically rigid rings 2 and 3 by engagement of folded portions of said covers intermediate opposite ends of said springs and said rings with which opposite ends of said covers are supported. The support ring 3b is a surrounding member of substantially rigid material engaging the inner side of the outer cover 4 and is only used in cartridges where density of the element material 6 or 7 is insufficient for supporting said outer cover 4 due to inward radial pressure of the fluid passing toward the spring 1 between the rings 2 and 3.

The operation of my filter cartridge is substantially as follows:

The annular curved portion 4b as shown in Fig. 1 of the drawings engages the upper inner portion of the filter casing providing a seal around the internal bore of the filter while the opposite end of the cartridge engages a conventional sealing means in the opposite end of the filter casing and longitudinal compression of my filter cartridge as shown in Fig. 1 of the drawings is resisted by the spring 1 which concurrently holds the fabric covers 4 and 5 in position for retaining the elements 6 and 7 and also retains the ends of the cover members 4 and 5 in interlocked relationship with the rings 2 and 3 as hereinbefore described. Liquid or other fluid being filtered passes through the outer cover 4 through the filtering element 6 then through the inner cover 5 and between the convolutions of the spring 1 and outwardly through the internal bore of the spring 1 to the outlet of the filter casing in which my filter cartridge is positioned. It will be here noted that the compression of the spring 1 which is in compressed condition between the rings 2 and 3 concurrently interlocks the folded portions of the covers 4 and 5 and imparts tension thereto due to the abutted relationship of opposite ends of said spring 1 with the plate 2 and 3 which serve to transfer tension in the spring 1 to the fabric covers 4 and 5 thus these covers 4 and 5 maintain the elements 6 and 7 in proper shape which elements may be of any desired material to accommodate certain filtering operations. The compression of the spring 1 serves to insure proper sealing at opposite ends of the filter cartridge in the filter casing to which it is adapted and the general shape and dimensional features of the cartridge are maintained by the spring 1 and the rings 2 and 3 independently of the element 6 and 7.

Figure 2:
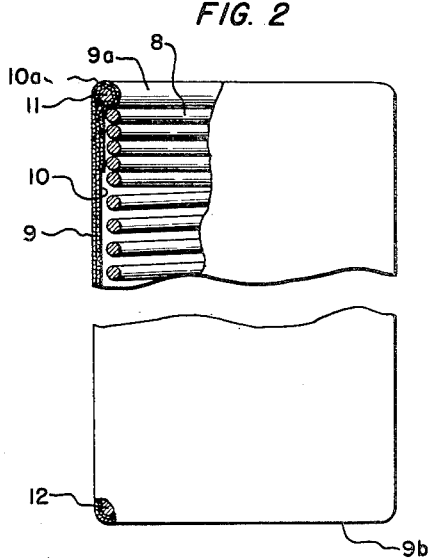

In the modification as shown in Fig. 2 of the drawings, the parts are designated as follows:

The spring 8, cover elements 9 and 10, and rings 11 and 12.

The spring 8 is a spring similar to the spring 1 hereinbefore described which abuts the rings 11 and 12 at its opposite ends which rings 11 and 12 are held in certain fixed spaced relationship by the covers 9 and 10. These cover elements 9 and 10 are foraminous covers preferably of flexible fabric or the like. It will be seen that the upper end of the cover 10 is looped over the ring 11 at the end 10a of said cover 10 while the outer cover 9 is folded over the portion 10a of the inner cover 10 and extends downwardly on the inside of the ring 11 and is held on the outer side of the end coils of the spring 8. The opposite end of the filter cartridge as shown in Fig. 2 of the drawings is substantially identical. Opposite ends 9a and 9b of the cover 9 are abutted to the conventional sealing mechanism in the filter casing when in operation. It will be here noted that the internal diameter of the rings 11 and 12 is equal to the internal diameter of the spring 8 plus the combined thickness of the covers 9 and 10 at opposite sides of the interior of said rings 11 and 12.

The operation of the cartridge as shown in Fig. 2 of the drawings is similar to the hereinbefore described operation of the structure shown in Fig. 1 of the drawings except that no filtering element is provided intermediate the cover members 9 and 10.

Figure 3:
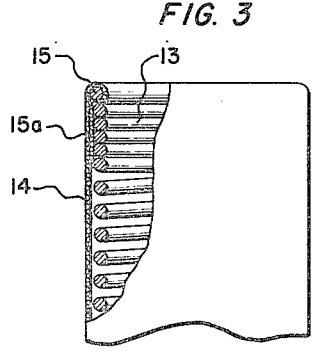
Figure 3 is a fragmentary elevational view of another modification of my filter cartridge showing only one end thereof.

In the modification as shown in Fig. 3 of the drawings, the spring 13, cover 14 and rings 15 constitute the principal parts and portions thereof. The structure as shown in Fig. 3 is similar to that shown in Fig. 2 except that a single cover 14 is looped over the ring 15 in abutted relationship with the end of the coil spring 13 and the extending end of the cover 15 at its portion 15a is secured on the outer side of the coil spring and the opposite end of this filter cartridge as shown in Fig. 3 of the drawings is similar to the fragmentary portion illustrated. The internal diameter of the ring 15 is equal to the internal diameter of the spring plus the thickness of the cover 14 at opposite sides of the interior of said ring 15.

Though I have shown and described a particular construction, combination and arrangement of parts and portions and certain modification I do not wish to be limited to this particular construction combination and arrangement nor to the modification but desire to include in the scope of my invention the construction, combination and arrangement substantially as set forth in the appended claims.

Having thus described my invention what I claim as new and desire to secure by Letters Patent is:

1. A cartridge for filtering liquid, comprising: a spiral compression spring of substantially uniform diameter; upper and lower thin rigid circular plates whose diameter is greter than twice the external diameter of said spring disposed at the ends thereof, each of said plates having a central circular opening whose diameter is less than the external diameter of said spring; a body of filter material disposed against the top face of the upper plate; and a tubular cover of closely woven fabric extending over said filter material and in contact with the edges of said plates, the bottom end of said cover being interlocked between said lower plate and the lower end of said spring and the top end of said cover being interlocked between said upper plate and the top end of said spring, the compression of said spring being enough to bias said plates apart with sufficient force to maintain the filter portion of said cover extending between said plates under considerable tension and in cylindrical shape.

2. A filter cartridge as claimed in claim 1; in which said body of filter material is substantially semi-circular in cross section.

3. A filter cartridge as claimed in claim 1; in which a cylindrical sleeve of closely woven fabric extends along the outside of said spring, the top end of said sleeve being interlocked between the top end of said cover and said upper plate and the bottom end of said sleeve being interlocked between the bottom end of said cover and said lower plate, the compression of said spring serving to maintain the fabric of said sleeve in a state of tension.

4. A filter cartridge as claimed in claim 3; in which the top end of said sleeve has a terminal portion extending out along the top face of said upper plate.

5. A filter cartridge as claimed in claim 3; in which the bottom end of said sleeve has a terminal portion extending out along the bottom face of said lower plate.

References Cited in the file of this patent

UNITED STATES PATENTS

| Number | Name | Date |
|---|---|---|
| 2,196,821 | Arnold | Apr. 9, 1940 |
| 2,274,352 | Wood | Feb. 24, 1942 |
| 2,314,640 | Winslow et al. | Mar. 23, 1943 |
| 2,463,137 | Bahlke | Mar. 1, 1949 |
| 2,521,833 | Dahl | Sept. 12, 1950 |
| 2,613,814 | Moore | Oct. 14, 1952 |